US 9,556,910 B2

(12) United States Patent
Yamamoto et al.

(10) Patent No.: US 9,556,910 B2
(45) Date of Patent: Jan. 31, 2017

(54) ROLLING BEARING DEVICE

(71) Applicant: JTEKT CORPORATION, Osaka-shi, Osaka (JP)

(72) Inventors: Takeshi Yamamoto, Izumisano (JP); Hiroshi Ueno, Tondabayashi (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/972,976

(22) Filed: Dec. 17, 2015

(65) Prior Publication Data

US 2016/0102710 A1    Apr. 14, 2016

Related U.S. Application Data

(62) Division of application No. 14/188,189, filed on Feb. 24, 2014, now Pat. No. 9,228,611.

(30) Foreign Application Priority Data

Mar. 1, 2013    (JP) .................... 2013-040824

(51) Int. Cl.
*F16C 33/66* (2006.01)
*F16C 37/00* (2006.01)
(Continued)

(52) U.S. Cl.
CPC .......... *F16C 33/6659* (2013.01); *F04B 43/043* (2013.01); *F16C 19/04* (2013.01);
(Continued)

(58) Field of Classification Search
CPC .......... F16C 19/04; F16C 19/06; F16C 23/025; F16C 35/042; F16C 33/583; F16C 33/664; F16C 33/6625; F16C 33/6607; F16C 33/6662; F16C 33/6659; F16C 33/667; F16C 35/06; F16N 9/02; F16N 29/04; F04B 23/025; F04B 43/046; F04B 43/043
(Continued)

(56) References Cited

U.S. PATENT DOCUMENTS 3,206,261 A      9/1965  Schaeffer
3,581,267 A  *  5/1971  Schreffler ............... F16C 33/60
                                                     439/17
(Continued)

FOREIGN PATENT DOCUMENTS

EP       1 980 840 A1    10/2008
JP       2004-108388 A    4/2004
(Continued)

OTHER PUBLICATIONS

Jun. 16, 2015 European Search Report issued in EP 14156806.3.
Oct. 25, 2016 Office Action issued in Japanese Patent Application No. 2013-040824.

*Primary Examiner* — Marcus Charles
(74) *Attorney, Agent, or Firm* — Oliff PLC

(57) ABSTRACT

A lubricant supply unit that supplies lubricating oil to a raceway groove of an inner ring is fixed to an outer ring. The lubricant supply unit is provided with a first and second radially separated electrodes used to supply electric power from an external power source to the micropump. Each of the first and second radially separated electrodes is fixed to an outer face of a tank that is stationary relative to the micropump so as to be exposed on the outside of the lubricant supply unit. The first radially separated electrode is arranged so as to be apart from the second radially separated electrode.

2 Claims, 9 Drawing Sheets

(51) Int. Cl.
*F04B 43/04* (2006.01)
*F16N 9/02* (2006.01)
*F16C 19/04* (2006.01)
*F16C 35/06* (2006.01)
*F16C 35/04* (2006.01)

(52) U.S. Cl.
CPC ........ *F16C 33/664* (2013.01); *F16C 33/6607* (2013.01); *F16C 33/667* (2013.01); *F16C 33/6625* (2013.01); *F16C 33/6651* (2013.01); *F16C 35/042* (2013.01); *F16C 35/06* (2013.01); *F16N 9/02* (2013.01)

(58) Field of Classification Search
USPC ........ 384/462, 464–465, 470–471, 473, 475; 439/17, 22
See application file for complete search history.

(56) References Cited

U.S. PATENT DOCUMENTS

| | | | |
|---|---|---|---|
| 4,738,336 A | 4/1988 | Smith et al. | |
| 4,858,427 A | 8/1989 | Provenzano | |
| 5,423,399 A | 6/1995 | Smith et al. | |
| 5,775,920 A * | 7/1998 | Henderson | B60R 16/027 439/15 |
| 5,851,120 A * | 12/1998 | Sobhani | H01R 39/643 439/13 |
| 5,853,294 A * | 12/1998 | Rehder | H01R 39/643 439/17 |
| 5,975,453 A * | 11/1999 | Sakata | B60R 16/027 428/421 |
| 6,299,454 B1 * | 10/2001 | Henderson | H01R 39/64 439/15 |
| 6,478,584 B2 * | 11/2002 | Vile | H01P 1/066 439/13 |
| 7,648,368 B2 * | 1/2010 | Fahrner | B64D 15/12 439/17 |
| 7,736,063 B1 | 6/2010 | Reitz et al. | |
| 7,883,271 B2 | 2/2011 | Suzuki et al. | |
| 9,188,462 B2 | 11/2015 | Omoto et al. | |
| 2005/0141796 A1 | 6/2005 | Katsuzawa et al. | |
| 2006/0165328 A1 | 7/2006 | Ueno et al. | |
| 2008/0112661 A1 | 5/2008 | Suzuki et al. | |
| 2009/0148087 A1 | 6/2009 | Suzuki et al. | |
| 2010/0003836 A1 * | 1/2010 | Koyama | H01R 39/643 439/29 |
| 2013/0099107 A1 | 4/2013 | Omoto et al. | |

FOREIGN PATENT DOCUMENTS

| | | |
|---|---|---|
| JP | 2004-316707 A | 11/2004 |
| JP | 2006-258192 A | 9/2006 |
| JP | 2007-138963 A | 6/2007 |
| JP | 2008-106900 A | 5/2008 |
| JP | 2008-304037 A | 12/2008 |
| JP | 2009-275736 A | 11/2009 |
| JP | 2010-078114 A | 4/2010 |
| JP | 2011-149532 A | 8/2011 |
| JP | 2012-102803 A | 5/2012 |
| WO | 2008/149520 A1 | 12/2008 |
| WO | 2012/002318 A1 | 1/2012 |

* cited by examiner

ROLLING BEARING DEVICE

INCORPORATION BY REFERENCE

This is a Division of U.S. application Ser. No. 14/188,189, filed Feb. 24, 2014, which claims priority to JP2013-040824, filed Mar. 1, 2013. The prior applications, including the specification, drawings and abstract are incorporated herein by reference in its entirety.

BACKGROUND OF THE INVENTION

1. Field of the Invention

The invention relates to a rolling bearing device including a first bearing ring, a second bearing ring, rolling elements, and a pump that supplies lubricant.

A conventional rolling bearing device of this type is described in Japanese Patent Application Publication No. 2012-102803 (JP 2012-102803 A). The rolling bearing device includes a ball bearing, a tank, a pump, and a battery. The tank stores grease. The tank has a discharge port. The pump sucks in the grease from the tank and discharges the grease from the discharge port.

The pump is operated by electric power from the battery. In the rolling bearing device, the grease stored in the tank is moved to the discharge port and the grease is discharged to a raceway surface of an outer ring. In this way, sliding portions are lubricated.

In the rolling bearing device, the pump is operated by the electric power from the battery. Therefore, if the battery capacity is increased, the size of the rolling bearing device is inevitably increased. If the electric power for the pump is generated by a generator to avoid the increase in the size of the rolling bearing device, the reliability of electric power supply is not high in the present circumstances. Therefore, an improvement in the reliability of the electric power supply is absolutely necessary.

On the other hand, if the electric power for the pump is supplied from an external power source, a wire extending over the rolling bearing device and a housing, to which the rolling bearing device is fixed, is required. However, when a work for fixing the rolling bearing device to the housing is performed, the wire obstructs smooth fixation of the rolling bearing device to the housing.

SUMMARY OF THE INVENTION

One object of the invention is to provide a compact rolling bearing device that is configured such that electric power is reliably supplied to a pump and that is easily attached to a housing.

An aspect of the invention relates to a rolling bearing device including: a first bearing ring having an inner periphery raceway surface; a second bearing ring having an outer periphery raceway surface; a plurality of rolling elements disposed between the inner periphery raceway surface of the first bearing ring and the outer periphery raceway surface of the second bearing ring; and a lubricant supply unit having at least a tank and a pump that supplies lubricant to at least one of the inner periphery raceway surface of the first bearing ring, the outer periphery raceway surface of the second bearing ring, and the rolling elements. The lubricant supply unit has one or more electrodes to which electric power is supplied from an external power source, and a part of the lubricant supply unit is fixed to one member out of the first bearing ring and the second bearing ring. Each of the one or more electrodes is fixed to the one member or the tank of the lubricant supply unit, the tank being stationary relative to the pump, in a state where each of the one or more electrodes is exposed on an outside of the one member or the tank of the lubricant supply unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the accompanying drawings.

Figure 1:
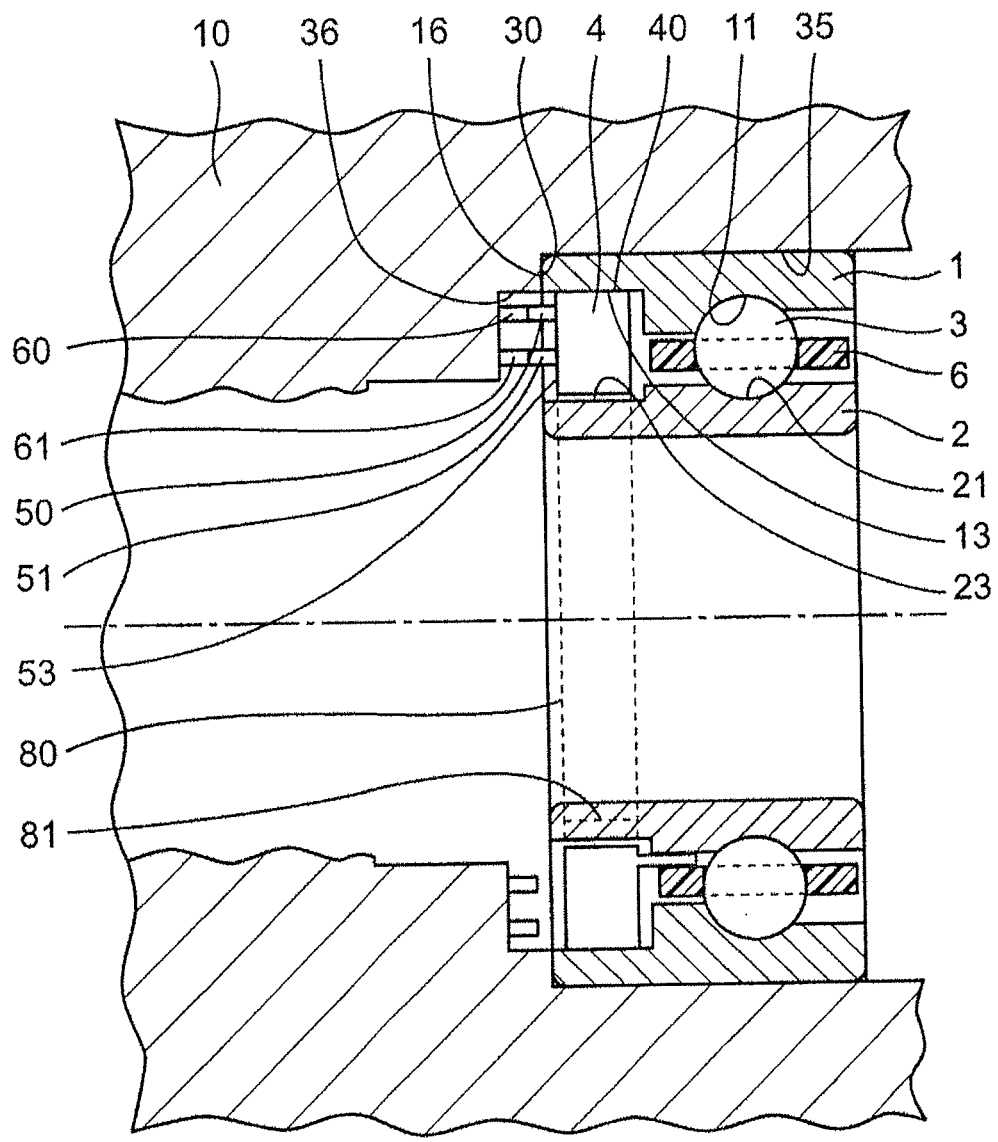
FIG. 1 is a schematic sectional view of a ball bearing device that is a rolling bearing device according to a first embodiment of the invention, the sectional view being taken along the axial direction of the ball bearing device.

FIG. 1 is a schematic sectional view of a ball bearing device that is a rolling bearing device according to a first embodiment of the invention, the sectional view being taken along the axial direction of the ball bearing device.

The ball bearing device includes an outer ring 1, which may function as a first bearing ring, an inner ring 2, which may function as a second bearing ring, a plurality of balls 3, which may function as a plurality of rolling elements, and a lubricant supply unit 4. The outer ring 1 may function as one member out of the first bearing ring and the second bearing ring. The outer ring 1 is fixed to a housing 10, which is as an example of a fixed member (a member to which the outer ring 1 is fixed).

Specifically, the housing 10 has a large-diameter cylindrical inner periphery portion 35 and a small-diameter cylindrical inner periphery portion 36. The inner diameter of the large-diameter cylindrical inner periphery portion 35 is larger than the inner diameter of the small-diameter cylindrical inner periphery portion 36. The housing 10 has a step portion 30 that extends radially inward from the large-diameter cylindrical inner periphery portion 35. The large-diameter cylindrical inner periphery portion 35 is connected to the small-diameter cylindrical inner periphery portion 36 via the step portion 30. As illustrated in FIG. 1, the outer peripheral face of the outer ring 1 is fixed to the large-diameter cylindrical inner periphery portion 35. One axial side end face 16 of the outer ring 1 is in contact with the step portion 30. In this way, the outer ring 1 is fixed to the housing 10. The axial end face of the step portion 30 constitutes the axial end face of the fixed member. The one axial side end face 16 of the outer ring 1 constitutes a positioning face of the one member.

The outer ring 1 has, in its inner periphery, an angular raceway groove 11, which may function as an inner periphery raceway surface. The height of one shoulder portion, which is located on one axial side of the raceway groove 11, is greater than the height of the other shoulder portion, which is located on the other axial side of the raceway groove 11. The outer ring 1 has a unit fixation recessed portion 13. The unit fixation recessed portion 13 is located on the opposite side of the one shoulder portion from the raceway groove 11 in the axial direction. The unit fixation recessed portion 13 is opened inward in the radial direction and also opened toward the one side in the axial direction.

The inner ring 2 is fixedly fitted onto a rotary shaft (not illustrated). The inner ring 2 has, in its outer periphery, a raceway groove 21, which may function as an outer periphery raceway surface, and a recessed portion 23. The recessed portion 23 is located on one axial side of the raceway groove 21 so as to be apart from the raceway groove 21 in the axial direction. The recessed portion 23 is opened outward in the radial direction and also opened toward the one side in the axial direction. The recessed portion 23 overlaps with the unit fixation recessed portion 13 in the radial direction.

The balls 3 are held between the raceway groove 11 of the outer ring 1 and the raceway groove 21 of the inner ring 2 by a cage 6, and arranged at intervals in the circumferential direction. The lubricant supply unit 4 has a generally rectangular shape in the sectional view illustrated in FIG. 1. The lubricant supply unit 4 has an annular shape. The lubricant supply unit 4 has a cylindrical outer peripheral face 40, and the cylindrical outer peripheral face 40 is fixedly fitted to the cylindrical inner peripheral face of the unit fixation recessed portion 13.

Although not illustrated, the cylindrical inner peripheral face of the unit fixation recessed portion 13 has, at a given position in the axial direction, an engagement recessed portion having a prescribed depth in the radial direction. The cylindrical outer peripheral face 40 of the lubricant supply unit 4 has, at a given position in the axial direction, an engagement projected portion having a prescribed height in the radial direction. The depth of the engagement recessed portion in the radial direction is substantially equal to the height of the engagement projected portion in the radial direction. By engaging the engagement projected portion with the engagement recessed portion, the lubricant supply unit 4 is reliably fixed to the outer ring 1. It is needless to say that an engagement projected portion may be formed on the cylindrical inner peripheral face of the unit fixation recessed portion 13 and an engagement recessed portion may be formed in the cylindrical outer peripheral face of the lubricant supply unit 4 and the engagement projected portion of the unit fixation recessed portion 13 may be engaged with the engagement recessed portion of the lubricant supply unit 4.

As illustrated in FIG. 1, the lubricant supply unit 4 is provided with a first radially separated electrode 50 and a second radially separated electrode 51. Each of the first radially separated electrode 50 and the second radially separated electrode 51 is fixed to one axial side end face 53 of the lubricant supply unit 4 so as to protrude in the axial direction from the one axial side end face 53. The first radially separated electrode 50 is located apart from the second radially separated electrode 51 in the radial direction of the outer ring 1. The first radially separated electrode 50 is an anode, and the second radially separated electrode 51 is a cathode. The first radially separated electrode 50 and the second radially separated electrode 51 are provided to supply electric power to a micropump 71 (described later) from an external power source.

In FIG. 1, reference numerals 60, 61 denote external electrodes on the power source side, which are fixed to the housing 10 so as to be immovable relative to the housing 10. As illustrated in FIG. 1, in a state where the one axial side end face 16 of the outer ring 1 is in contact with the step portion 30, the first external electrode 60 is in contact with the first radially separated electrode 50 and the second external electrode 61 is in contact with the second radially separated electrode 51. Each of the first and second external electrodes 60, 61 has an annular shape. With this configuration, even if the outer ring 1 moves in the circumferential direction relative to the housing 10, the first external electrode 60 and the first radially separated electrode 50 are kept in contact with each other and the second external electrode 61 and the second radially separated electrode 51 are kept in contact with each other.

Figure 2:
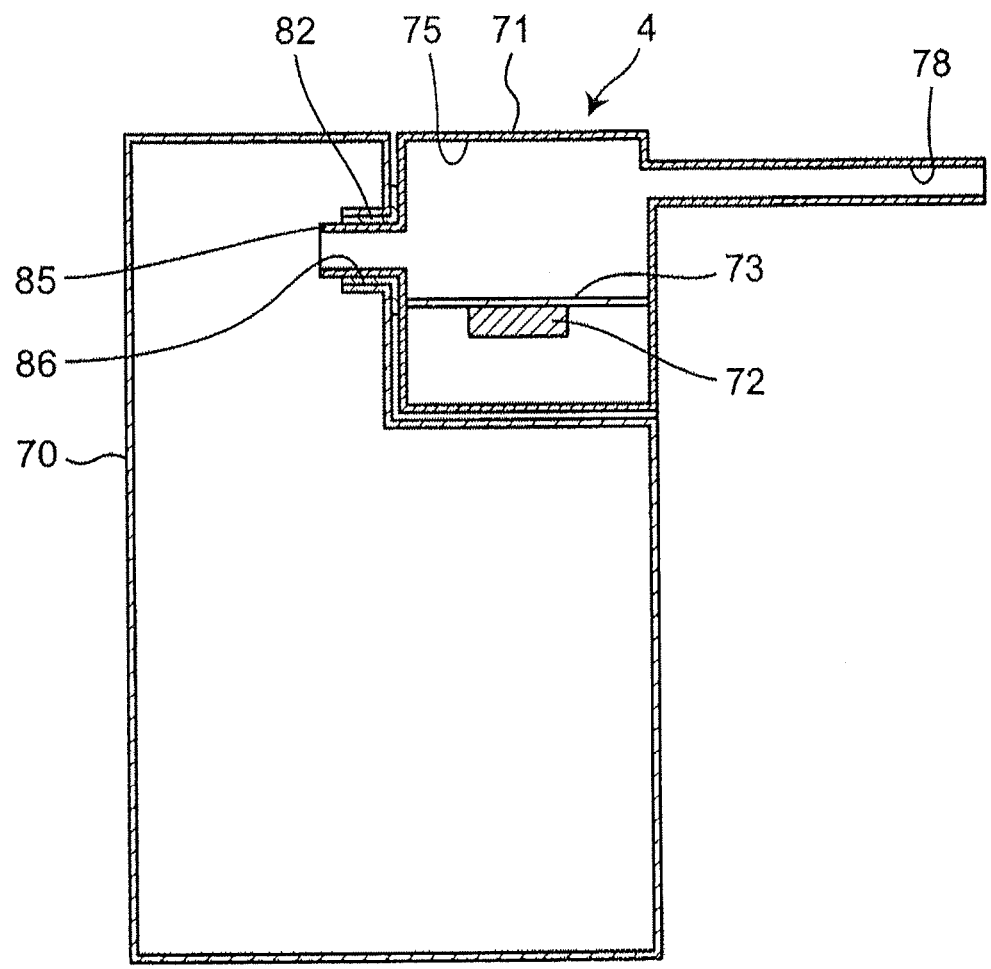
FIG. 2 is an enlarged schematic sectional view illustrating part of the ball bearing device in FIG. 1, the part being part of a lubricant supply unit illustrated in a lower half part of FIG. 1.

FIG. 2 is an enlarged schematic sectional view illustrating part of the ball bearing device in FIG. 1, the part being part of the lubricant supply unit 4 illustrated in a lower half part of FIG. 1.

As illustrated in FIG. 2, the lubricant supply unit 4 includes a tank 70 and the micropump 71 having a driven portion. The tank 70 is formed of a hollow annular member that stores lubricating oil. Note that the tank 70 may be a non-annular member that is installed in a prescribed angular range in the circumference direction.

The micropump 71 is a diaphragm pump. The micropump 71 includes a piezoelectric element 72, a diaphragm 73, which serves as the driven portion, and a discharge nozzle 78. The discharge nozzle 78 is directed to a position near one end of the raceway groove 21 of the inner ring 2 and the balls 3.

The electric power from the external power source is supplied to the piezoelectric element 72 through the first radially separated electrode 50 and the second radially separated electrode 51 to drive the piezoelectric element 72. The diaphragm 73 is pulled and pushed by the piezoelectric element 72 to suck in the lubricating oil from the tank 70 into a pump chamber 75 and discharge the sucked lubricating oil from the discharge nozzle 78. In this way, the lubricating oil from the tank 70 is supplied to the position near the raceway groove 21 of the inner ring 2 and the balls 3, by a minute amount each time.

Referring again to FIG. 1, dashed lines 80 extending in the up-down direction in FIG. 1 indicate that the tank 70 has an annular shape (this applies also to the following embodiments). A dashed line 81 extending in the lateral direction in FIG. 1 indicates a region of a phase in the circumferential direction, where the micropump 71 is present (this applies also to the following embodiments). As a base oil of the lubricating oil, any one of an ester oil, an ether oil, a fluorinated oil, a silicone oil, and a synthetic hydrocarbon oil may be used. Examples of the lubricating oil include a fluorinated polymer oil, a fluorinated polyether oil, an alkyl diphenyl ether oil, a polyphenyl ether oil, a polyol ester oil, and a polyalpha olefin oil. As the lubricating oil, one of these oils may be used by itself or a mixture of two or more of these oils may be used. Alternatively, grease may be used instead of the lubricating oil. In the invention, a miniature motor or the like may be used instead of the piezoelectric element 72.

As illustrated in FIG. 2, the micropump 71 has, on its side face, a lubricant suction nozzle 85. The nozzle 85 is fixedly fitted in a lubricant supply hole 86, which is formed in a side face of the tank 70, with a rubber tube 82 interposed between the nozzle 85 and the wall face of the lubricant supply hole 86. In this way, the tank 70 and the micropump 71 are coupled to each other with the tank 70 and the micropump 71 communicated with each other.

Note that, in FIG. 2, the illustration of a wire for the micropump 71 and the first and second radially separated electrodes 50, 51 (see FIG. 1) is omitted. The wire for the micropump 71 is disposed so as to hardly appear outside the lubricant supply unit 4. Specifically, the first and second radially separated electrodes 50, 51 for the micropump 71 are fixed to an end face of the tank 70 of the lubricant supply unit 4 so as to be immovable relative to the tank 70.

According to the first embodiment, the first and second radially separated electrodes 50, 51, to which electric power for driving the micropump 71 is supplied, are fixed to the tank 70 that is stationary relative to the micropump 71, in a state where the first and second radially separated electrodes 50, 51 are exposed on the outside of the tank 70 of the lubricant supply unit 4. As a result, only the electrodes 50, 51 are exposed on the outside of the tank 70 of the lubricant supply unit 4 and the wire hardly appears outside the lubricant supply unit 4. Therefore, it is possible to easily fit the ball bearing device to the housing 10 without being obstructed by the wire, just by bringing the first and second radially separated electrodes 50, 51, which are exposed in a state where they are fitted to the prescribed positions of the ball bearing device, into contact with the first and second external electrodes 60, 61 arranged at the prescribed positions of the housing 10.

According to the first embodiment, it is possible to supply the electric power for operating the micropump 71 from the external power source. As a result, it is possible to improve the reliability of electric power supply, and an increase in the size of the ball bearing device due to an increase in the battery capacity is no longer necessary.

According to the first embodiment, the radially separated electrodes 50, 51 are fixed to the axial end face of the tank 70. As a result, it is possible to easily and reliably bring the first and second radially separated electrodes 50, 51 for the micropump 71 into contact with the external electrodes 60, 61 disposed on the face of the housing 10, which faces the end face of the tank 70 in the axial direction.

According to the first embodiment, the outer ring 1 to which the lubricant supply unit 4 is fixed has the end face 16, which serves as the positioning face that comes into contact with the housing 10 in the axial direction. The end face 16 is located at a position apart from the first and second radially separated electrodes 50, 51. As a result, it is possible to bring the end face 16 into close contact with the end face of the step portion 30 of the housing 10 without a gap. Therefore, it is possible to more accurately carry out positioning of the ball bearing device. As a result, it is possible to reliably bring the first and second external electrodes 60, 61 into contact with the first and second radially separated electrodes 50, 51 for the micropump 71.

In the first embodiment, the one member is the outer ring 1, and the first and second radially separated electrodes 50, 51 for the micropump 71 are connected to the first and second external electrodes 60, 61 disposed on the housing 10 to which the outer ring 1 is fixed, respectively. Alternatively, in the invention, the one member may be the inner ring, and electrodes for the pump may be connected to external electrodes disposed on the shaft member to which the inner ring is fixed.

In the first embodiment, each of the first and second external electrodes 60, 61 has an annular shape, whereas each of the first and second radially separated electrodes 50, 51 for the micropump 71 has a non-annular shape. Alternatively, in the invention, each external electrode may have a non-annular shape, whereas each electrode for the pump may have an annular shape. In this way, the electrodes may be configured such that electrical connection is maintained even if the electrodes for the pump move in the circumferential direction relative to the external electrodes.

In the first embodiment, each of the first and second external electrodes 60, 61 has an annular shape, whereas each of the first and second radially separated electrodes 50, 51 for the micropump 71 has a non-annular shape. Alternatively, in the invention, both the external electrodes and the electrodes for the pump may have a non-annular shape. This is because, if positioning of the one member is carried out such that the one member is immovable relative to the fixed member and positioning of the pump is carried out such that the pump is immovable relative to the one member, it is possible to reliably maintain the electrical connection even if both the external electrodes and the electrodes for the pump have a non-annular shape.

In the first embodiment, the lubricant supply unit 4 is fixed to the outer ring 1 by engaging the engagement recessed portion and the engagement projected portion with each other. Alternatively, in the invention, the lubricant supply unit 4 may be fixed to the one member with an adhesive, or the lubricant supply unit 4 may be fixed to the one member by press-fitting. Further alternatively, the lubricant supply unit 4 may be fixed to the one member in such a manner that the lubricant supply unit 4 is held between a step portion and a snap ring in the axial direction, so that the lubricant supply unit 4 is immovable relative to the one member in the axial direction. Further alternatively, the lubricant supply unit 4 may be fixed to the one member with the use of a fastening member. In the invention, the lubricant supply unit 4 may be fixed to the one member in any known method.

In the first embodiment, the lubricant supply unit 4 has the two electrodes 50, 51. Alternatively, in the invention, the lubricant supply unit 4 may have only one electrode, and only one external electrode corresponding to the one electrode may be provided. Further alternatively, in the invention, the lubricant supply unit 4 may have three or more electrodes, and external electrodes the number of which corresponds to the number of the electrodes may be provided.

In the first embodiment, the first and second radially separated electrodes 50, 51 for the micropump 71 are fixed to the tank 70 of the lubricant supply unit 4 so as to be immovable relative to the tank 70, which may function as a stationary member. Alternatively, in the invention, at least one electrode for the micropump 71 may be provided with an urging member that urges the electrode in one direction and fixed to the one member or the tank 70 of the lubricant supply unit 4, in a state where the position of the one electrode relative to the one member or the tank 70 of the lubricant supply unit 4, which is stationary relative to the micropump 71, is variable. Electrical connection may be reliably established by pressing the at least one electrode to the corresponding external electrode in the one direction.

This configuration may be achieved by fixing one end portion of a metal spring (formed of a coil spring, a helical spring, or the like) to the axial end face of the one member or the tank 70 electrically connecting the one end portion to the wire for the pump, and fixing the other end portion of the metal spring to the electrode that is guided by a cylindrical guide portion or the like and prevented from moving in directions other than the one direction. In this case, it is needless to say that the spring itself is disposed in the cylindrical guide portion.

In the first embodiment, the lubricant supply unit 4 includes the micropump 71. Alternatively, in the invention, the lubricant supply unit 4 may include a common pump of which the size and other features are not restricted, instead of the micropump 71.

In the first embodiment, the first and second external electrodes 60, 61 are fixed to the housing 10. Alternatively, in the invention, the external electrodes may be fixed to a member that is fixed to the housing. For example, the external electrodes may be fixed to, for example, a spacer.

In the first embodiment, a main body of the lubricant supply unit 4 is disposed between the outer ring 1 and the inner ring 2 in the radial direction. Alternatively, in the invention, part of or the entirety of the lubricant supply unit may be disposed in a space other than the space between the first bearing ring and the second bearing ring in the radial direction. This configuration may be achieved by fixing a part of the lubricant supply unit to an axial end face of the first bearing ring with an adhesive or the like. In addition, the micropump 71 and the tank 70, which are parts of the main body of the lubricant supply unit 4, may be removable from each other.

In the first embodiment, the nozzle 78 of the micropump 71 is directed to the raceway groove 21 of the inner ring 2 and the balls 3. Alternatively, in the invention, the nozzle of the pump may be directed to at least one of the raceway surface of the inner ring and each rolling element and the raceway surface of the outer ring.

In the first embodiment, the ball bearing device does not include a seal member that seals the space between the outer ring 1 and the inner ring 2. Alternatively, in the invention, a seal member that seals at least one axial side of the space between the first bearing ring and the second bearing ring may be provided.

In the first embodiment, the raceway groove of the outer ring 1 is the angular raceway groove 11, whereas the raceway groove of the inner ring 2 is the raceway groove 21 that is not an angular raceway groove. Alternatively, in the invention, both the first bearing ring and the second bearing ring may have angular raceway grooves, one of the first bearing ring and the second bearing ring may have an angular raceway groove, or neither the first bearing ring nor the second bearing ring may have an angular raceway groove.

In the first embodiment, one member out of the first bearing ring and the second bearing ring is the outer ring 1, and the other member out of the first bearing ring and the second bearing ring is the inner ring 2. Alternatively, in the invention, one member out of the first bearing ring and the second bearing ring may be the outer ring or the inner ring, and the other member out of the first bearing ring and the second bearing ring may be an intermediate ring. Further alternatively, in the invention, one member out of the first bearing ring and the second bearing ring may be an intermediate ring, and the other member out of the first bearing ring and the second bearing ring may be the outer ring or the inner ring.

In the first embodiment, the rolling elements are the balls 3. Alternatively, in the invention, the rolling elements may be cylindrical rollers, tapered rollers, convex rollers (spherical rollers), or needle rollers. Alternatively, in the rolling bearing device according to the invention, two or more kinds of rolling elements selected from balls, cylindrical rollers, tapered rollers, and convex rollers (spherical rollers) may be arranged in respective rows of which the number corresponds to the number of types of the rolling elements.

Figure 3:
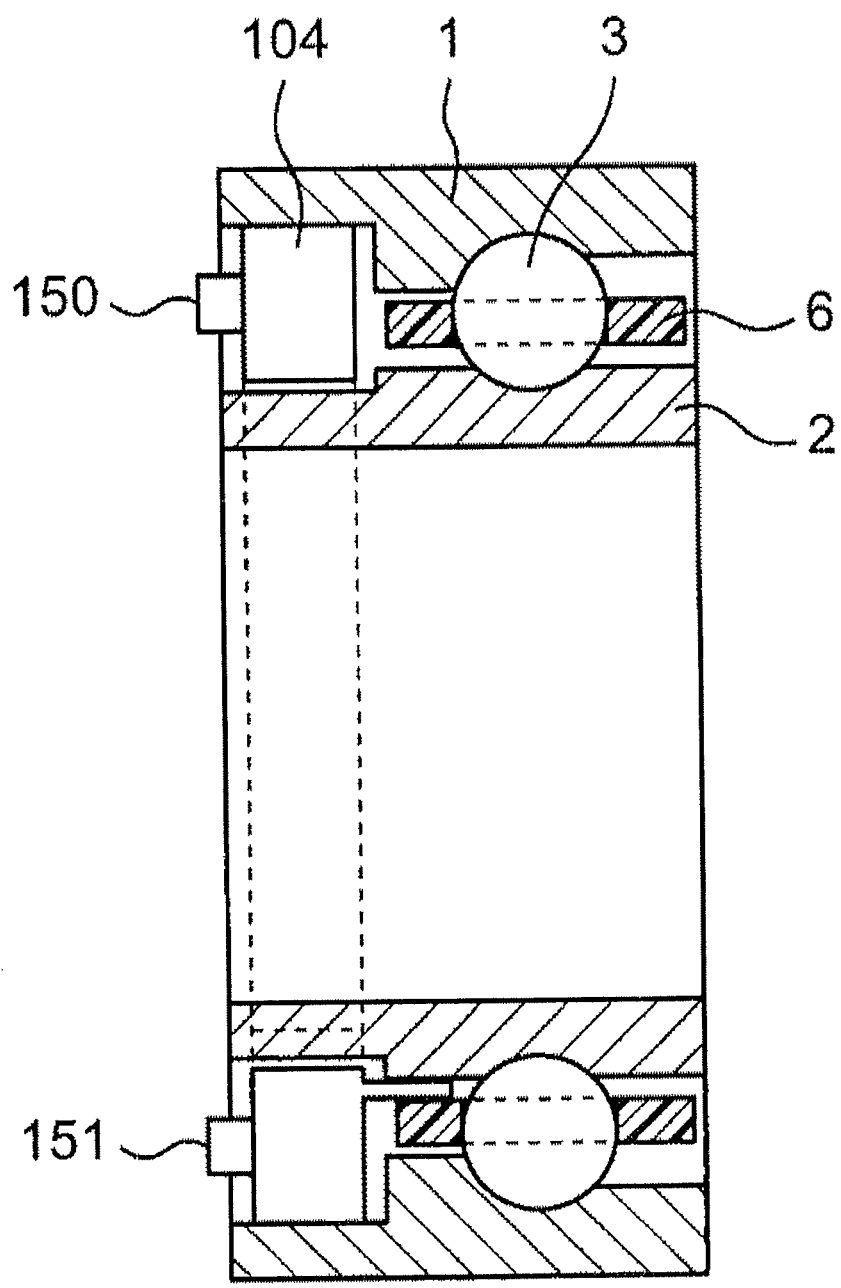
FIG. 3 is a schematic sectional view of a ball bearing device that is a rolling bearing device according to a second embodiment of the invention, the sectional view being taken along the axial direction of the ball bearing device.

FIG. 3 is a schematic sectional view of a ball bearing device that is a rolling bearing device according to a second embodiment of the invention, the sectional view being taken along the axial direction of the ball bearing device. Note that, in the second embodiment, the same configurations as those in the first embodiment will be denoted by the same reference numerals as those in the first embodiment, and detailed description thereof will be omitted. Further, in the second embodiment, description of the same advantageous effects and modified examples as those in the first embodiment will be omitted.

In the ball bearing device according to the second embodiment, a micropump of a lubricant supply unit 104 is provided with a first circumferentially separated electrode 150 and a second circumferentially separated electrode 151. The first circumferentially separated electrode 150 is located so as to be apart from the second circumferentially separated electrode 151 in the circumferential direction of the outer ring 1, which may function as one member.

According to the second embodiment, the first circumferentially separated electrode 150 is apart from the second circumferentially separated electrode 151 in the circumferential direction. As a result, it is possible to reliably prevent the first circumferentially separated electrode 150 and the second circumferentially separated electrode 151 from being electrically connected to each other, and securely connect the first circumferentially separated electrode 150 and the second circumferentially separated electrode 151 to external electrodes.

Figure 4:
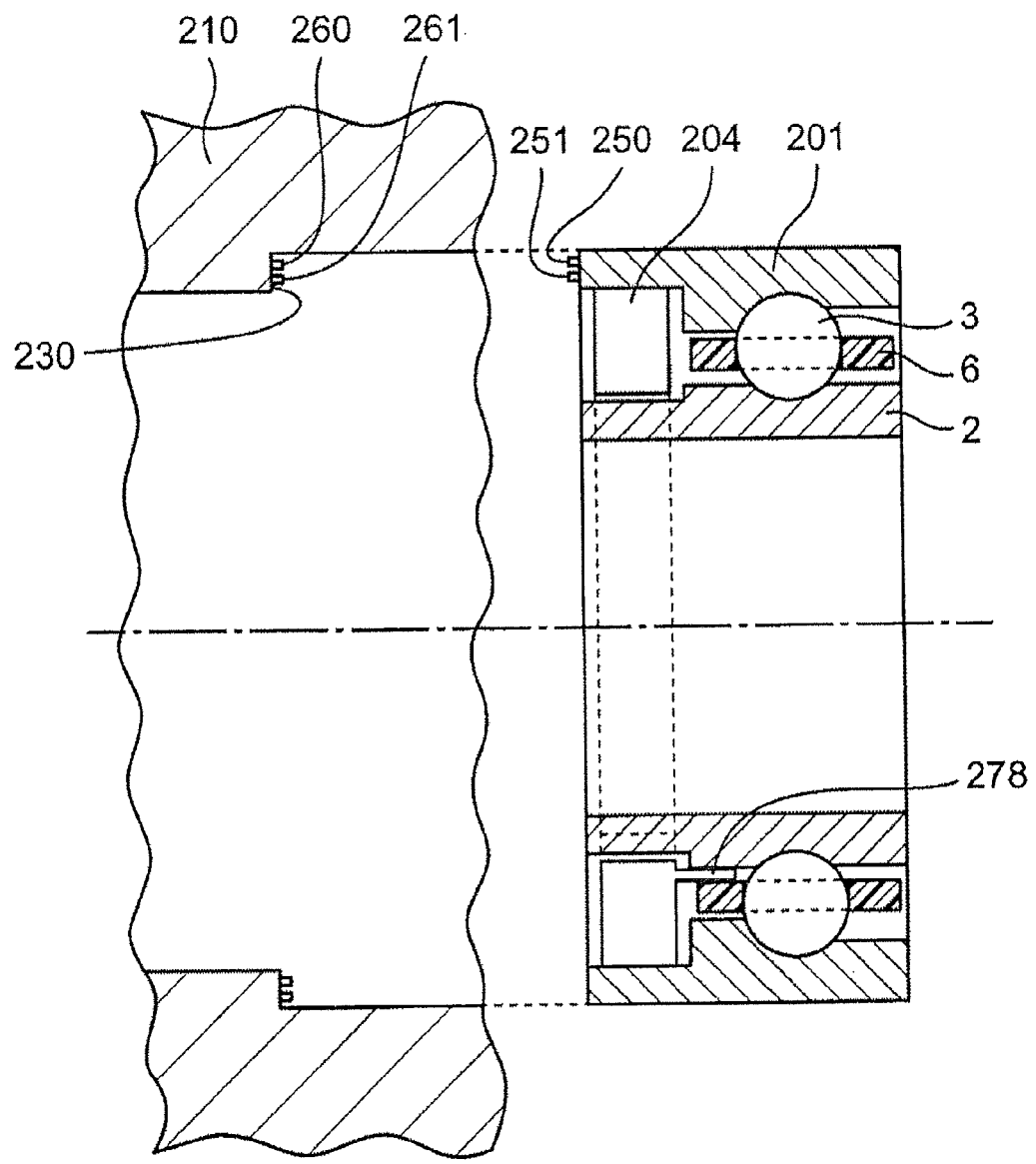
FIG. 4 is a schematic sectional view of a ball bearing device that is a rolling bearing device according to a third embodiment of the invention, the sectional view being taken along the axial direction of the ball bearing device.

FIG. 4 is a schematic sectional view of a ball bearing device that is a rolling bearing device according to a third embodiment of the invention, the sectional view being taken along the axial direction of the ball bearing device. Note that, in the third embodiment, the same configurations as those in the first embodiment will be denoted by the same reference numerals as those in the first embodiment, and detailed description thereof will be omitted. Further, in the third embodiment, description of the same advantageous effects and modified examples as those in the first embodiment will be omitted.

The third embodiment differs from the first embodiment in the following respect. Electrodes 250, 251 for a micropump of a lubricant supply unit 204 are fixed to an outer ring 201, which may function as one member in the third embodiment, whereas the first and second radially separated electrodes 50, 51 for the micropump 71 are fixed to the tank 70 of the lubricant supply unit 4.

In the third embodiment, the lubricant supply unit 204 is fixed to the inner peripheral face of the outer ring 201 by fixing means such as an adhesive. The micropump of the lubricant supply unit 204 has the first radially separated electrode 250 and the second radially separated electrode 251. The first radially separated electrode 250 is located at the same phase (position) in the circumferential direction as the second radially separated electrode 251. On the other hand, the first radially separated electrode 250 is apart from the second radially separated electrode 251 in the radial direction.

Each of the first radially separated electrode 250 and the second radially separated electrode 251 protrudes in the axial direction from one axial side end face of the outer ring 201. Each of the first radially separated electrode 250 and the second radially separated electrode 251 is fixed to the outer ring 201, in a state where the first and second radially separated electrodes 250, 251 are exposed on the outside of the outer ring 201. Two wires for the micropump of the lubricant supply unit 204 extend to the one axial side end face of the outer ring 201 through a passage (not illustrated) formed in the outer ring 201. One wire is electrically connected to the first radially separated electrode 250, and the other wire is electrically connected to the second radially separated electrode 251.

In the third embodiment, a housing 210 has an annular step portion 230, and an annular first external electrode 260 and an annular second external electrode 261 are disposed on the axial end face of the step portion 230 so as to protrude in the axial direction from the axial end face. The position of the first external electrode 260 in the axial direction coincides with the position of the second external electrode 261 in the axial direction, and the position of the first external electrode 260 in the circumferential direction also coincides with the position of the second external electrode 261 in the circumferential direction. Further, the first external electrode 260 is apart from the second external electrode 261 in the radial direction.

The outer ring 201 is pushed toward the step portion 230 of the housing 210 until the first radially separated electrode 250 comes into contact with the first external electrode 260 and the second radially separated electrode 251 comes into contact with the second external electrode 261. In this way, the outer ring 201 is fixed to the housing 210. Note that, in FIG. 4, a reference numeral 278 denotes a nozzle of the micropump.

According to the third embodiment, the first and second radially separated electrodes 250, 251 are fixed to the outer ring 201, which may function as one member that is fixed to the housing 210, which may function as a fixed member. Thus, it is possible to set the positions, at which the first and second radially separated electrodes 250, 251 are present, closer to the housing 210 on which the first and second external electrodes 260, 261 are disposed. As a result, it is possible to electrically connect the first and second radially separated electrodes 250, 251 to the first and second external electrodes 260, 261 more easily and reliably.

Figure 5:
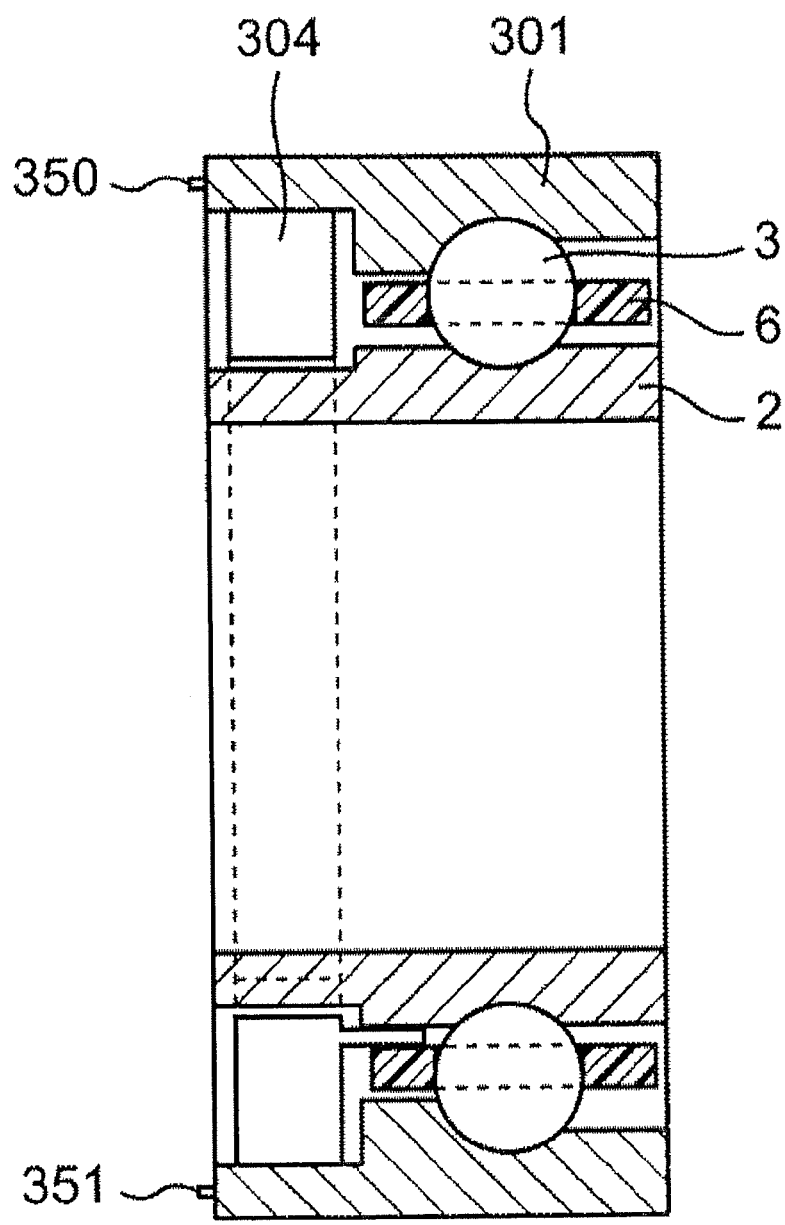
FIG. 5 is a schematic sectional view of a ball bearing device that is a rolling bearing device according to a fourth embodiment of the invention, the sectional view being taken along the axial direction of the ball bearing device.

FIG. 5 is a schematic sectional view of a ball bearing device that is a rolling bearing device according to a fourth embodiment of the invention, the sectional view being taken along the axial direction of the ball bearing device. Note that, in the fourth embodiment, the same configurations as those in the first embodiment will be denoted by the same reference numerals as those in the first embodiment, and detailed description thereof will be omitted. Further, in the fourth embodiment, description of the same advantageous effects and modified examples as those in the first embodiment will be omitted.

In the fourth embodiment, a lubricant supply unit 304 has a first circumferentially separated electrode 350 and a second circumferentially separated electrode 351. The feature of the fourth embodiment that the first and second circumferentially separated electrodes 350, 351 are fixed to an outer ring 301, which may function as one member fixed to a housing which may function as a fixed member, is the same as the above-described feature of the third embodiment. However, the fourth embodiment differs from the third embodiment in that the two electrodes 350, 351 are not separated not in the radial direction but in the circumferential direction.

In the fourth embodiment as well as in the third embodiment, it is possible to set the positions, at which the first and second circumferentially separated electrodes 350, 351 are present, closer to the housing. As a result, it is possible to electrically connect the first and second circumferentially separated electrodes 350, 351 to the external electrodes more easily and reliably.

Figure 6:
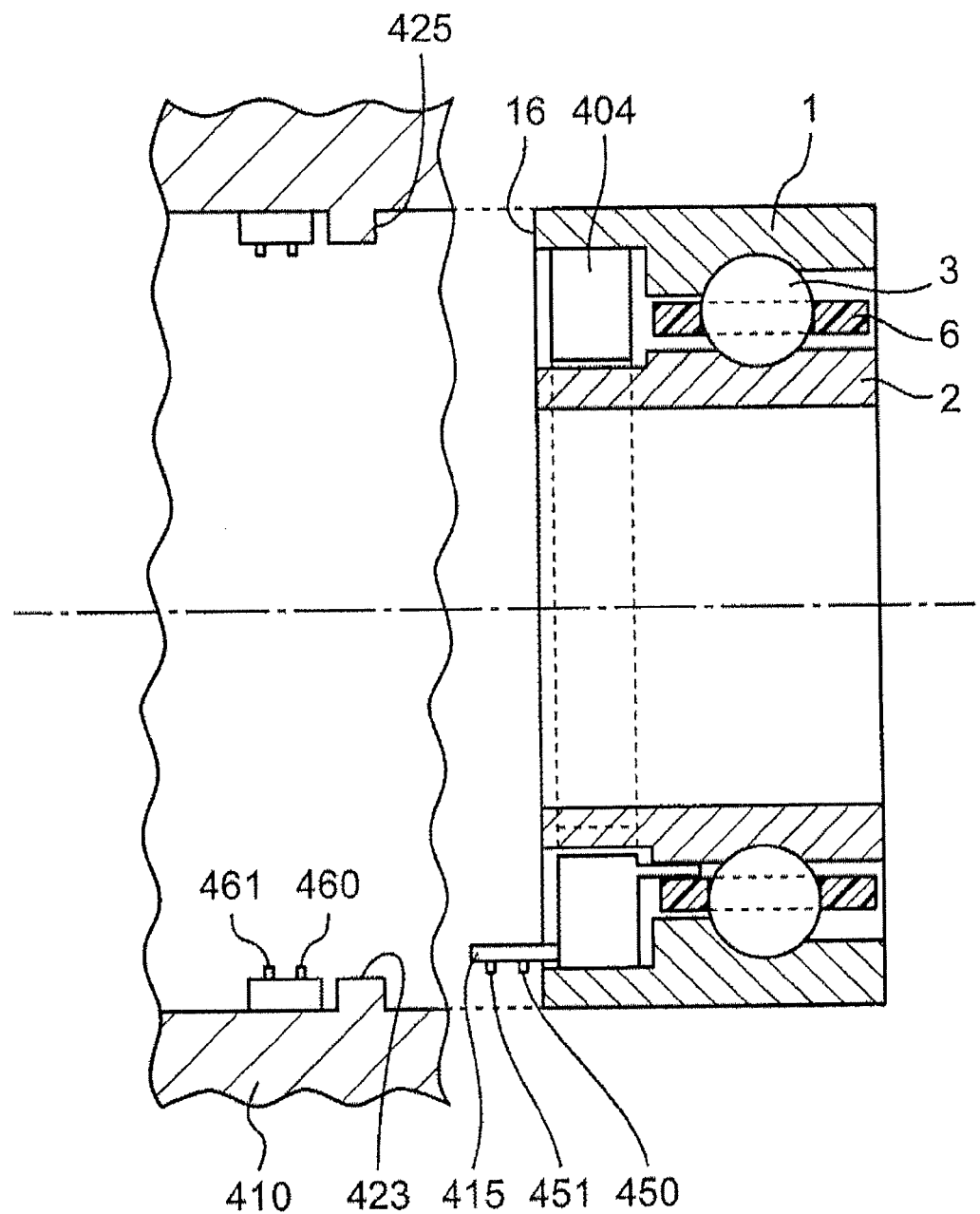
FIG. 6 is a schematic sectional view of a ball bearing device that is a rolling bearing device according to a fifth embodiment of the invention, the sectional view being taken along the axial direction of the ball bearing device.

FIG. 6 is a schematic sectional view of a ball bearing device that is a rolling bearing device according to a fifth embodiment of the invention, the sectional view being taken along the axial direction of the ball bearing device. Note that, in the fifth embodiment, the same configurations as those in the first embodiment will be denoted by the same reference numerals as those in the first embodiment, and detailed description thereof will be omitted. Further, in the fifth embodiment, description of the same advantageous effects and modified examples as those in the first embodiment will be omitted. In addition, in the fifth embodiment, description of the same advantageous effects as those in the second to fourth embodiments will be omitted.

As illustrated in FIG. 6, in the fifth embodiment, a lubricant supply unit 404 has a rod-like electrode formed portion 415 that protrudes in the axial direction. The lubricant supply unit 404 has a first axially separated electrode 450 and a second axially separated electrode 451. Each of the first axially separated electrode 450 and the second axially separated electrode 451 is fixed to the electrode formed portion 415. The first axially separated electrode 450 is apart from the second axially separated electrode 451 in the axial direction. As illustrated in FIG. 6, each of the first axially separated electrode 450 and the second axially separated electrode 451 protrudes radially outward from the electrode formed portion 415.

In the fifth embodiment, a housing 410 has an annular protrusion 423 used for positioning. The protrusion 423 has a generally rectangular shape in a cross section taken along the axial direction. By bringing the axial end face 16 of the outer ring 1 into contact with one axial side end face 425 of the annular protrusion 423, the outer ring 1 is positioned with respect to the housing 410. As illustrated in FIG. 6, first and second external electrodes 460, 461 that protrude inward in the radial direction are fixed to the inner peripheral face of the housing 410. The first external electrode 460 is apart from the second external electrode 461 in the axial direction. In a state where the axial end face 16 of the outer ring 1, which may function as one member, is in contact with the one axial side end face 425 of the annular protrusion 423, the first axially separated electrode 450 is electrically connected to the first external electrode 460, whereas the second axially separated electrode 451 is electrically connected to the second external electrode 461. In the fifth embodiment, the two electrodes 450, 451 are apart from each other in the axial direction. Thus, it is possible to reliably prevent the first axially separated electrode 450 and the second axially separated electrode 451 from being electrically connected to each other.

Figure 7:
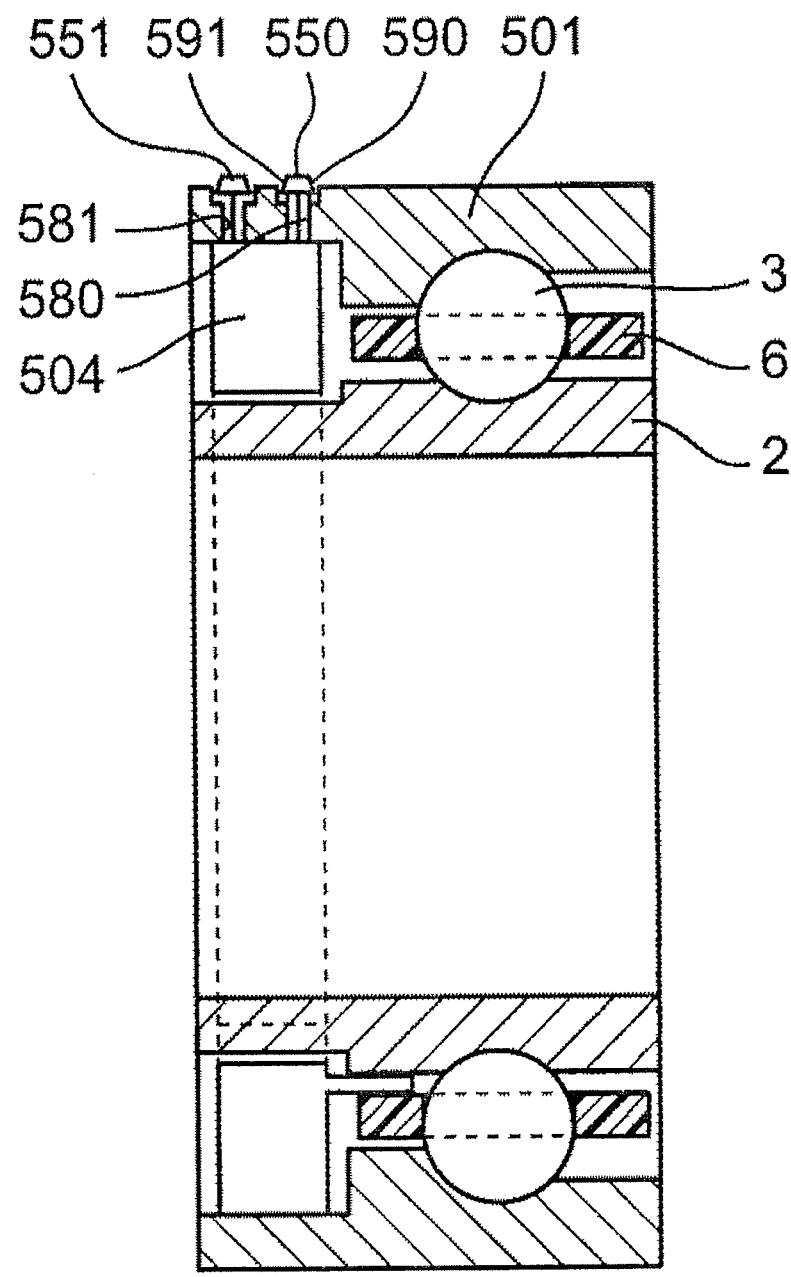
FIG. 7 is a schematic sectional view of a ball bearing device that is a rolling bearing device according to a sixth embodiment of the invention, the sectional view being taken along the axial direction of the ball bearing device.

FIG. 7 is a schematic sectional view of a ball bearing device that is a rolling bearing device according to a sixth embodiment of the invention, the sectional view being taken along the axial direction of the ball bearing device. Note that, in the sixth embodiment, the same configurations as those in the first embodiment will be denoted by the same reference numerals as those in the first embodiment, and detailed description thereof will be omitted. Further, in the sixth embodiment, description of the same advantageous effects and modified examples as those in the first embodiment will be omitted. In addition, in the sixth embodiment, description of the same advantageous effects as those in the second to fifth embodiments will be omitted.

The sixth embodiment differs from the other embodiments in that each of two electrodes 550, 551 for a micropump of a lubricant supply unit 504 is exposed on the radially outside of the outer peripheral face of an outer ring 501, which may function as one member.

Specifically, the lubricant supply unit 504 is fixed to the inner peripheral face of the outer ring 501. Further, the outer ring 501 has a first through-hole 580 and a second through-hole 581 at the same phase in the circumferential direction. The first through-hole 580 and the second through-hole 581 are extended in the radial direction to pass through the outer ring 501. The first through-hole 580 is apart from the second through-hole 581 in the axial direction.

As illustrated in FIG. 7, each of the first through-hole 580 and the second through-hole 581 has a recessed portion, which is able to accommodate the entirety of an electrode, at its radially outer end portion. The recessed portion of the first through-hole 580 is able to accommodate the first axially separated electrode 550, whereas the recessed portion of the second through-hole 581 is able to accommodate the second axially separated electrode 551. All the portion of the first through-hole 580 other than the recessed portion overlaps with the first axially separated electrode 550 in the radial direction. All the portion of the second through-hole 581 other than the recessed portion overlaps with the second axially separated electrode 551 in the radial direction. The first axially separated electrode 550 is electrically connected to one of electrodes for the micropump by a wire extending through the first through-hole 580. The second axially separated electrode 551 is electrically connected to the other one of the electrodes for the micropump by a wire extending through the second through-hole 581.

Although not illustrated, the ball bearing device in the sixth embodiment has two urging members (each of which is formed of a coil spring or the like). One urging member out of the two urging members extends through the first through-hole 580. The other urging member extends through the second through-hole 581. One end portion of the one urging member is in contact with the radially outer face of the lubricant supply unit 504. The other end portion of the one urging member is in contact with the radially inner end face bottom face) of the first axially separated electrode 550. The one urging member urges the first axially separated electrode 550 in the radially outward direction, which is an example of one direction. In order to fix the outer peripheral face of the outer ring 501 at a prescribed position on the inner peripheral face of a housing (not illustrated), the first axially separated electrode 550 is pushed radially inward by, for example, the inner peripheral face of the housing so as to be located within the recessed portion of the first through-hole 580, during axial movement of the first axially separated electrode 550 relative to the inner peripheral face of the housing.

Specifically, as illustrated in FIG. 7, in a section taken along the axial direction, each of one axial side end face 590 and the other axial side end face 591 of the first axially separated electrode 550 is sloped toward the center of the first axially separated electrode 550 such that the distance between the axial end faces 590, 591 is reduced in a direction toward the radially outer side. That is, each of the axial end faces 590, 591 of the first axially separated electrode 550 is a sloped face that is tapered toward the radially outer side. Because the one axial side end face 590 and the other axial side end face 591 of the first axially separated electrode 550 are formed into the sloped faces, the first axially separated electrode 550 falls into the recessed portion by a radially inward force that one of the sloped faces 590, 591 receives from the housing when the housing is moved in the axial direction relative to the outer ring 501.

On the other hand, when the outer ring 501 is fixed to a prescribed position of the housing, the first axially separated electrode 550 is pushed toward a first external electrode (not illustrated), which is disposed on the inner peripheral side of the housing, radially outward by the urging member. In this way, the first axially separated electrode 550 is electrically connected to the first external electrode reliably. The second axially separated electrode 551 is electrically connected to a second external electrode, which is disposed on the inner peripheral side of the housing, by the same structure as that of the first axially separated electrode 550. In the sixth embodiment, in the above-described manner, electric power is supplied to the micropump of the lubricant supply unit 504 from an external power source.

The urging members are disposed in the first through-hole 580 and the second through-hole 581 in the sixth embodiment. Alternatively, in the invention, it is not necessary to dispose an urging member in one of or both of the first through-hole and the second through-hole. This is because, performing dimensional management enables electrical connection between the electrodes of the lubricant supply unit and the external electrodes even if the urging members are not provided.

Figure 8:
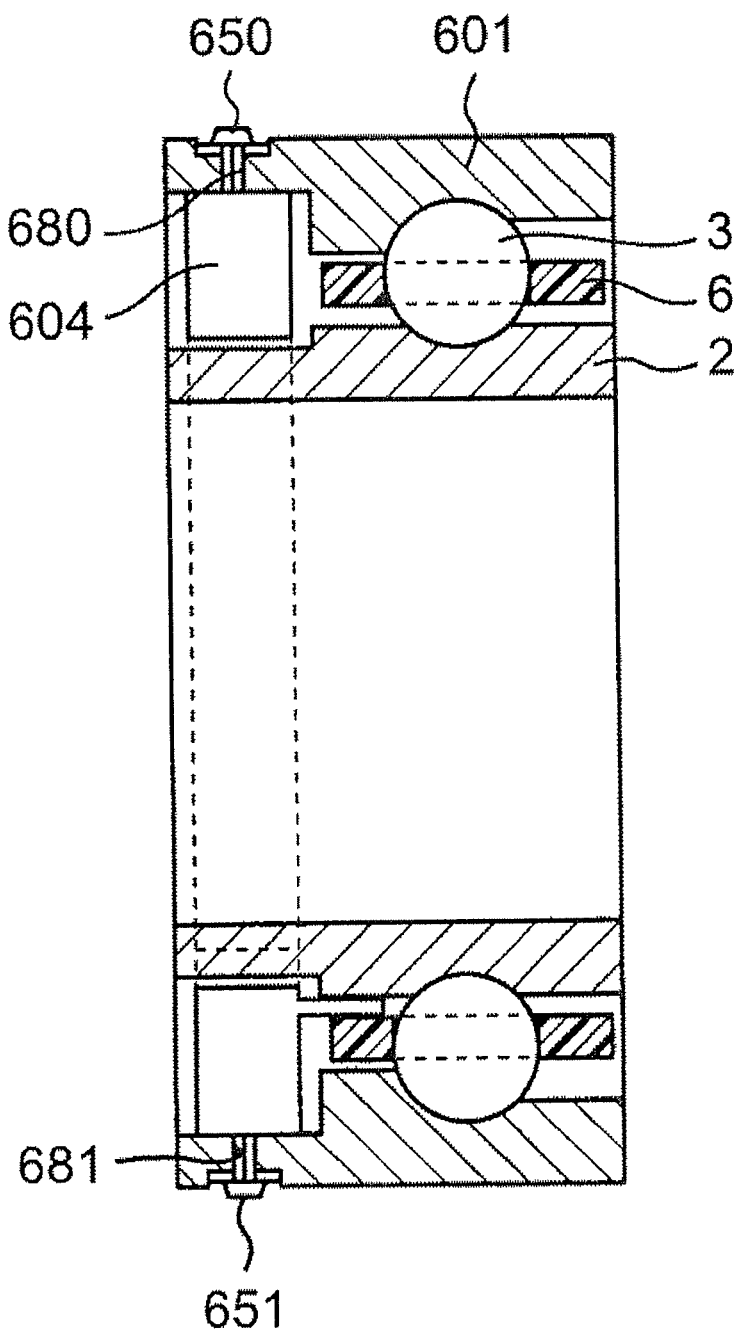
FIG. 8 is a schematic sectional view of a ball bearing device that is a rolling bearing device according to a seventh embodiment of the invention, the sectional view being taken along the axial direction of the ball bearing device.

FIG. 8 is a schematic sectional view of a ball bearing device that is a rolling bearing device according to a seventh embodiment of the invention, the sectional view being taken along the axial direction of the ball bearing device. Note that, in the seventh embodiment, the same configurations as those in the first embodiment will be denoted by the same reference numerals as those in the first embodiment, and detailed description thereof will be omitted. Further, in the seventh embodiment, description of the same advantageous effects and modified examples as those in the first embodiment will be omitted. In addition, in the seventh embodiment, description of the same advantageous effects as those in the second to sixth embodiments will be omitted. Note that, in FIG. 8, a reference numeral 601 denotes an outer ring that may function as one member, and a reference numeral 604 denotes a lubricant supply unit.

The seventh embodiment differs from the sixth embodiment in that a first circumferentially separated electrode 650 and a second circumferentially separated electrode 651 are apart from each other not in the axial direction but in the circumferential direction. On the other hand, the seventh embodiment is the same as the sixth embodiment in the following respects. The first circumferentially separated electrode 650 is electrically connected to a first external electrode (not illustrated) disposed on the inner peripheral side of a housing with the use of a first through-hole 680 and an urging member (not illustrated), and the second circumferentially separated electrode 651 is electrically connected to a second external electrode (not illustrated) disposed on the inner peripheral side of the housing with the use of a second through-hole 681 and an urging member (not illustrated). In addition, the seventh embodiment is the same as the sixth embodiment in the following respects. The axial end faces of each of the circumferentially separated electrodes 650, 651 are formed as sloped faces.

Figure 9:
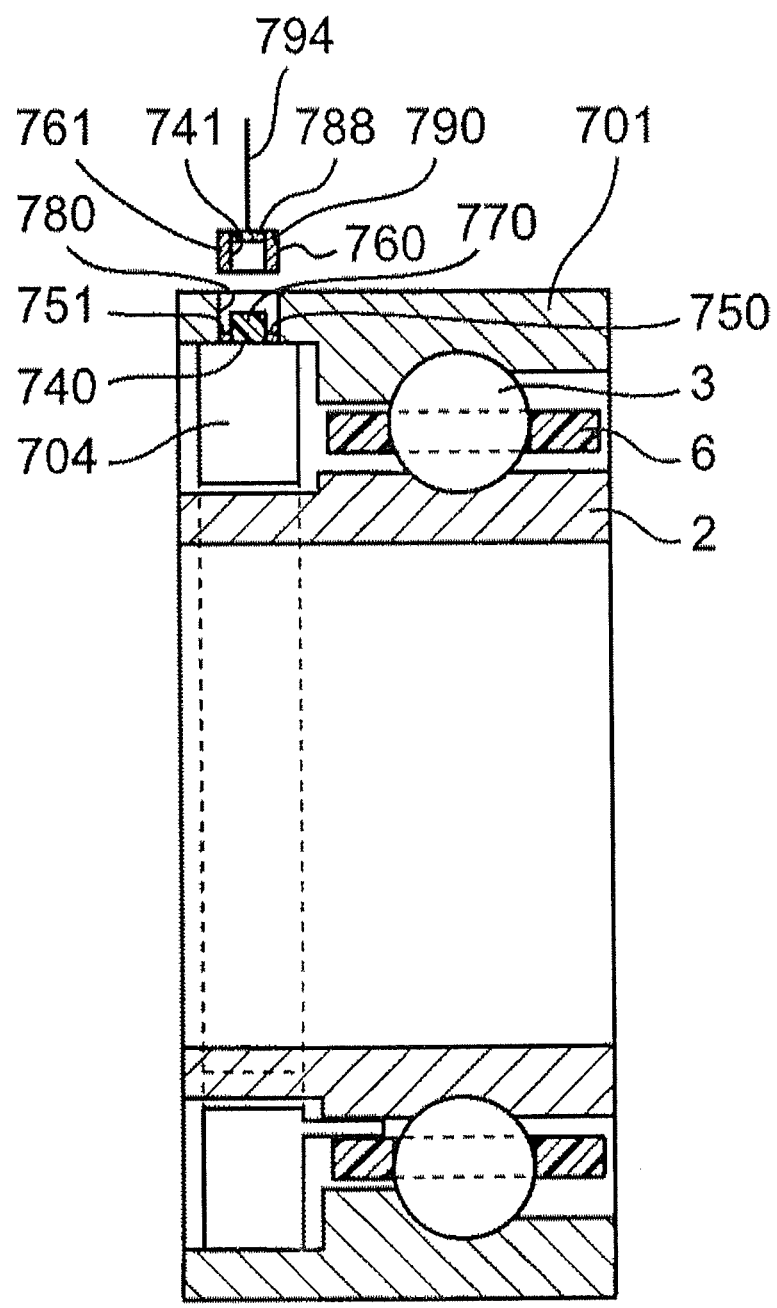
FIG. 9 is a schematic sectional view of a ball bearing device that is a rolling bearing device according to an eighth embodiment of the invention, the sectional view being taken along the axial direction of the ball bearing device.

FIG. 9 is a schematic sectional view of a ball bearing device that is a rolling bearing device according to an eighth embodiment of the invention, the sectional view being taken along the axial direction of the ball bearing device. Note that, in the eighth embodiment, the same configurations as those in the first embodiment will be denoted by the same reference numerals as those in the first embodiment, and detailed description thereof will be omitted. Further, in the eighth embodiment, description of the same advantageous effects and modified examples as those in the first embodiment will be omitted. In addition, in the eighth embodiment, description of the same advantageous effects as those in the second to seventh embodiments will be omitted.

The eighth embodiment differs from the other embodiments in that electric power is supplied from an external power source to first and second axially separated electrodes 750, 751 for a micropump of a lubricant supply unit 704 of the ball bearing device with the use of a connector (socket) 790.

Specifically, in the eighth embodiment, the radially outer face of the lubricant supply unit 704 is fixed to an outer ring 701, which may function as one member. Part of a portion of the outer ring 701, the portion overlapping with the lubricant supply unit 704 in the radial direction, has a through-hole 780 that extends through the outer ring 701 in the radial direction. Part of the outer face of the lubricant supply unit 704 is exposed to the outside.

As illustrated in FIG. 9, an electrode structural body 740 is fixed to part of the outer face of the lubricant supply unit 704. The electrode structural body 740 includes the first axially separated electrode 750, the second axially separated electrode 751, and an insulating portion 770. The first axially separated electrode 750 and the second axially separated electrode 751 are disposed such that the insulating portion 770 is interposed therebetween in the axial direction. The first axially separated electrode 750 is apart from the second axially separated electrode 751 in the axial direction. The height of the first axially separated electrode 750 coincides with the height of the second axially separated electrode 751.

As illustrated in FIG. 9, the connector 790 has a recessed portion 741 having a rectangular cross section. The depth of the recessed portion 741 is substantially equal to the length obtained by subtracting the height of the first axially separated electrode 750 from the height of the insulating portion 770. The shape of the recessed portion 741 conforms to the shape of a portion of the insulating portion 770, which protrudes from the first and second axially separated electrodes 750, 751.

As illustrated in FIG. 9, the connector 790 includes a first external electrode 760 and a second external electrode 761. The first external electrode 760 and the second external electrode 761 face each other with the recessed portion 741 interposed therebetween. The connector 790 has an insulating portion 788, and the insulating portion 788 overlaps with the recessed portion 741 in the depth direction of the recessed portion 741. The first external electrode 760 and the second external electrode 761 are reliably prevented from being electrically connected to each other by the insulating portion 788.

The recessed portion of the connector 790 is fitted onto the portion of the insulating portion 770, which protrudes from the first and second axially separated electrodes 750, 751, so that the first axially separated electrode 750 is electrically connected to the first external electrode 760 and the second axially separated electrode 751 is electrically connected to the first external electrode 761.

Note that a reference numeral 794 denotes a cable of the connector 790. Two wires are disposed in the cable 794 so as not to be electrically connected to each other. Although not described in detail, a housing (not illustrated) to which an outer ring 701, which may function as one member, has a through-hole. The through-hole overlaps with the electrode structural body 740 in the radial direction of the outer ring 701 in a state where the outer ring 701 is fixed to a prescribed position of the housing. In this way, the connector 790 is connected to the electrode structural body 740 from the outside via the through-hole of the housing. Note that, it is needless to say that, if the through-hole 780 of the outer ring 701 is formed so as not to overlap with the housing in the radial direction, it is no longer necessary to form a through-hole in the housing.

According to the eighth embodiment, because it is possible to manually connect or disconnect the connector 790 to or from the electrode structural body 740, maintenance of, for example, the lubricant supply unit 704 can be easily and rapidly carried out.

When the rolling bearing device according to the invention has only two electrodes, the two electrodes may be disposed such that none of their axial directions, radial directions, and circumferential directions coincide with each other, the two electrodes may be disposed such that only one kind of directions among their axial directions, radial directions and the circumferential directions coincide with each other, or the two electrodes may be disposed such that only two kinds of directions among their axial directions, radial directions and the circumferential directions coincide with each other.

When the rolling bearing according to the invention has anodes and cathodes for supplying electric power to the pump, there may be two or more electrodes that serve as the anodes, and the two or more electrodes may be connected to each other by a wire. When the rolling bearing according to the invention has anodes and cathodes for supplying electric power to the pump, there may be two or more electrodes that serve as the cathodes, and the two or more electrodes may be connected to each other through a wire. As described above, the degree of flexibility of electrical connection with an external power source may be increased.

Note that the rolling bearing device according to the invention may be mounted in any machines such as an industrial machine and a construction machine. Further, it is needless to say that two or more configurations described in the first to eighth embodiments and all the modified examples may be combined with each other.

What is claimed is:
1. A rolling bearing device comprising:
a first bearing ring having an inner periphery raceway surface;
a second bearing ring having an outer periphery raceway surface;

a plurality of rolling elements disposed between the inner periphery raceway surface of the first bearing ring and the outer periphery raceway surface of the second bearing ring; and a lubricant supply unit having at least a tank and a pump that supplies lubricant to at least one of the inner periphery raceway surface of the first bearing ring, the outer periphery raceway surface of the second bearing ring, and the rolling elements, wherein the lubricant supply unit has one or more electrodes to which electric power to operate the pump is supplied from an external power source, and a part of the lubricant supply unit is fixed to one of the first bearing ring and the second bearing ring, and each of the one or more electrodes is fixed to (i) the one of the first bearing ring and the second bearing ring or (ii) the lubricant supply unit, in a state where each of the one or more electrodes is exposed on an outside of i) the one of the first bearing ring and the second bearing ring or ii) the lubricant supply unit, and each of the one or more electrodes is fixed to a peripheral face of the one of the first bearing ring and the second bearing ring, or an end face of the one of the first bearing ring and the second bearing ring.

2. The rolling bearing device according to claim 1, wherein:

the electrodes include a first electrode and a second electrode, the first electrode and the second electrode being separated from each other i) in a circumferential direction of the one of the first bearing ring and the second bearing ring or ii) in a radial direction of the one of the first bearing ring and the second bearing ring.

* * * * *